(12) United States Patent
Shimada et al.

(10) Patent No.: US 6,891,151 B2
(45) Date of Patent: May 10, 2005

(54) PROBE WITH HOLLOW WAVEGUIDE AND METHOD FOR PRODUCING THE SAME

(75) Inventors: Yasuhiro Shimada, Kanagawa (JP); Ryo Kuroda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/879,905

(22) Filed: Jun. 14, 2001

(65) Prior Publication Data

US 2002/0024004 A1 Feb. 28, 2002

(30) Foreign Application Priority Data

Jun. 16, 2000 (JP) ........................................ 2000/180894

(51) Int. Cl.$^7$ ................................................. H01J 5/16
(52) U.S. Cl. ........................... 250/234; 250/216; 73/105
(58) Field of Search ............................. 385/31, 38, 43, 385/117, 118; 250/234, 306, 307, 310, 216; 73/105

(56) References Cited

U.S. PATENT DOCUMENTS

| | | | |
|---|---|---|---|
| 4,688,893 A | * 8/1987 | Laakmann | 385/125 |
| 5,343,460 A | 8/1994 | Miyazaki et al. | 369/126 |
| 5,351,229 A | * 9/1994 | Brezoczky et al. | 369/99 |
| 5,354,985 A | * 10/1994 | Quate | 250/234 |
| 5,439,777 A | 8/1995 | Kawada et al. | 430/270 |
| 5,677,978 A | 10/1997 | Lewis et al. | 385/147 |
| 5,902,715 A | * 5/1999 | Tsukamoto et al. | 385/130 |
| 5,959,957 A | 9/1999 | Ikeda et al. | 369/127 |
| 5,969,821 A | * 10/1999 | Muramatsu et al. | 356/613 |
| 6,156,215 A | 12/2000 | Shimada et al. | 216/11 |
| 6,201,226 B1 | 3/2001 | Shimada et al. | 250/201.3 |
| 6,275,453 B1 | * 8/2001 | Ueyanagi et al. | 369/44.14 |
| 6,396,050 B1 | * 5/2002 | Yamamoto et al. | 250/216 |
| 6,528,780 B1 | * 3/2003 | Mitsuoka et al. | 250/216 |
| 6,535,474 B1 | * 3/2003 | Yee et al. | 369/112.01 |

FOREIGN PATENT DOCUMENTS

| | | |
|---|---|---|
| JP | 2-98849 | 4/1990 |
| JP | 4-90152 | 3/1992 |
| JP | 10-293134 | 11/1998 |
| JP | 11-64350 | 3/1999 |
| JP | 11-66650 | 3/1999 |

OTHER PUBLICATIONS

R.C. Reddick et al., "New form of scanning optical microscopy", Physical Review B, The American Physical Society, vol. 39, No. 1, Jan. 1, 1989, pp. 767–770.
G. Binning et al., "Surface Studies by Scanning Tunneling Microscopy", Physical Review Letters, The American Physical Society, vol. 49, Jul. 5, 1982, pp. 57–61.
U. Dürig et al., "Near–field optical–scanning microscopy", Journal of Applied Physics, 1986 American Institute of Physics, vol. 59, No. 10, May 15, 1986, pp. 3318–3327.

* cited by examiner

Primary Examiner—Thanh X. Luu
Assistant Examiner—Stephen Yam
(74) Attorney, Agent, or Firm—Fitzpatrick, Cella, Harper & Scinto

(57) ABSTRACT

A probe for detecting light or irradiating light comprises a cantilever supported at an end thereof by a substrate, a hollow tip formed at a free end of the cantilever, a microaperture formed at the end of the tip, and a hollow waveguide formed inside the cantilever.

A method for producing a probe for light detection or light irradiation which comprises the steps of working a substrate to form a groove therein, forming a flat plate-shaped cover portion on the groove to form a hollow waveguide having an opening in a part thereof, forming a hollow tip having a microaperture on the opening, and removing a part of the substrate by etching, to form a cantilever.

13 Claims, 12 Drawing Sheets

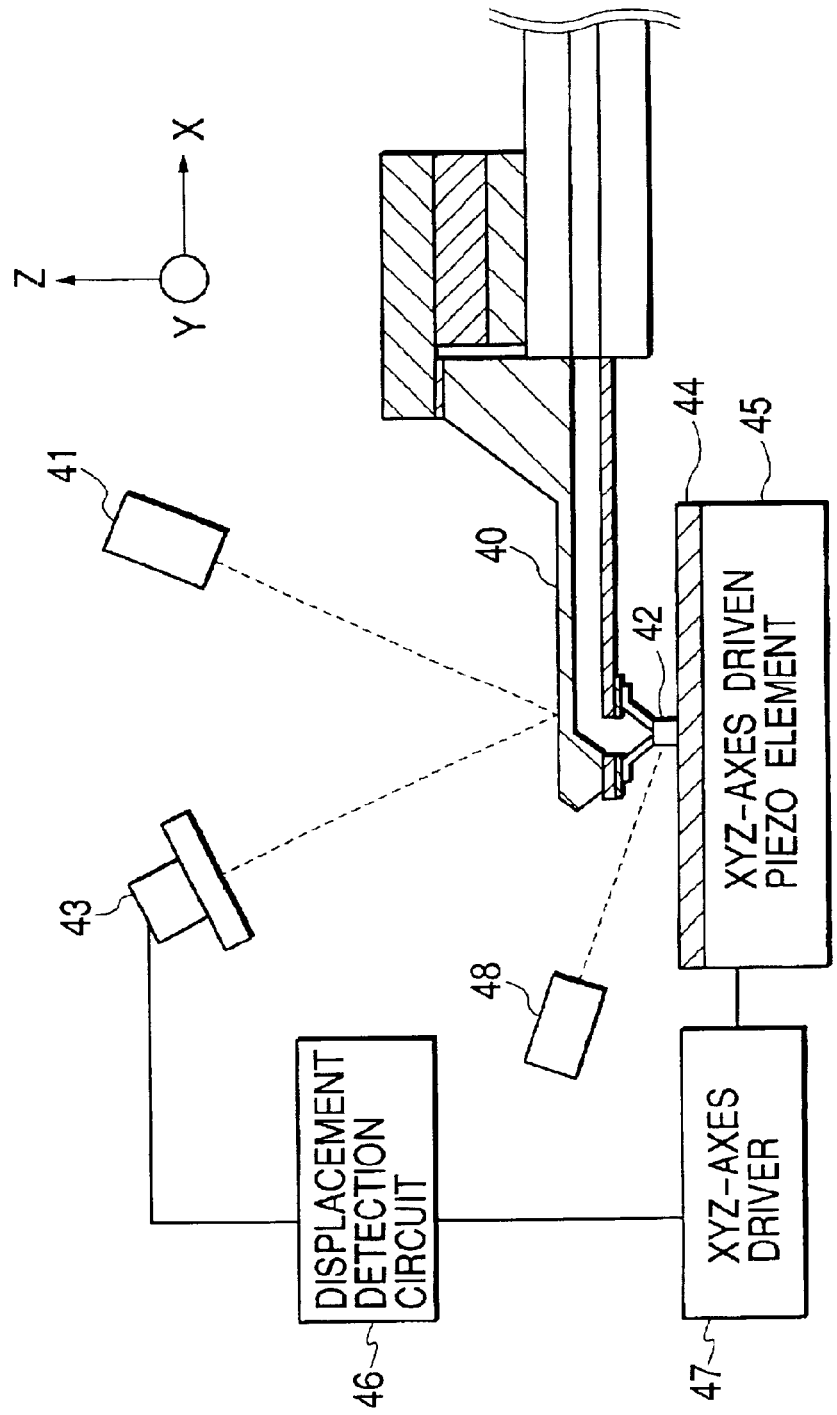

PROBE WITH HOLLOW WAVEGUIDE AND METHOD FOR PRODUCING THE SAME

BACKGROUND OF THE INVENTION

1. Field of the Invention

The present invention relates to a probe, a method for producing the same, a surface observation apparatus, an exposure apparatus and an information processing apparatus, and more particularly to a probe for evanescent light detection or irradiation for use in a near field optical microscope or the like and a producing method therefor.

2. Related Background Art

Since the development of the scanning tunneling microscope (hereinafter represented as STM) (G. Binnig et al., Phys. Rev. Lett, 49, 57(1982)) capable of directly observing the electronic structure of surfacial atoms of a conductor has enabled the measurement of both monocrystalline and amorphous materials with a high resolution in a real spatial image, the scanning probe microscopes (SPM) are being actively investigated in the field of evaluation of microstructures of various materials. Among the SPM, there are known a scanning tunneling microscope (STM), an atomic force microscope (AFM), a magnetic force microscope (MFM) etc. which detect the surfacial structure by a tunneling current, an atomic force, a magnetic force, a light etc. obtained by positioning a probe with a micro-tip close to a specimen to be evaluated.

Also as an extension of the STM, there has been developed a scanning near field optical microscope (SNOM) (Durig et al., J. Appl. Phys. 59, 3318(1986)) for surveying the surface of a specimen by detecting the evanescent light, leaking from an optical microaperture at the end of a pointed probe, from the surface of the specimen with an optical probe.

Also there has been developed a photon STM (Reddick et al., Phys. Rev. B39, 767(1989)) which is a kind of SNOM and in which the surface of a specimen is surveyed by introducing light from the rear surface of the specimen through a prism and under a total reflecting condition and detecting the evanescent light leaking out to the front surface of the specimen with an optical probe.

The optical probes employed in such near field optical microscope include, for example, an optical fiber sharpened at an end and provided with an optical microaperture at the end, and a cantilever provided at a free end thereof with a needle or tip for light irradiation or light detection to realize the function of an AFM. For the probe of such cantilever type, there is proposed a method of working an end of an optical fiber to form an optical microaperture on a projecting part and bending the optical fiber to make it function as a cantilever (U.S. Pat. No. 5,677,978).

However, the above-mentioned method employing the optical fiber is associated with the drawbacks of low productivity and difficulty in aligning the shape because the probes have to be worked one by one. As a countermeasure, there has been disclosed a probe producing method of transferring a light-transmitting projection formed on a first substrate onto a waveguide formed on a second substrate, then forming a micro-tip layer on the surface of the projection and forming an optical microaperture which have a diameter smaller than the wavelength of the light at the end of the micro-tip layer (Japanese Patent Application Laid-open No. 10-293134). This method is realizable in a batch process, so that it has a high productivity and satisfactory reproducibility of the optical microaperture. Also this method, easily allowing integration and size reduction, enables easy manufacture of plural probes. Also there is obtained an advantage of allowing easy coupling with a semiconductor laser by transferring the projection onto a substrate of a compound semiconductor.

However the probe according to Japanese Patent Application Laid-open No. 10-293134 employs a ceramic material principally composed of silicon oxide or an organic material for the waveguide, and is therefore associated with a drawback that the waveguide shows a large light absorption in a short wavelength region such as ultraviolet region, deteriorating the transmission efficiency.

Also since the projection having the optical microaperture and the waveguide layer are separately prepared and are optically connected in a later step, there is required a complex process in forming the optical connecting portion between the waveguide layer and the optical microaperture, in which there is a drawback to be resolved. Further, the light-transmitting efficiency in the optical connecting portion is decreased, in which there is also a drawback to be resolved.

SUMMARY OF THE INVENTION

In consideration of the foregoing, the object of the present invention is to provide a light detecting or irradiating probe capable of reducing the light transmission loss between the waveguide and the optical microaperture or that in the short wavelength region in the waveguide while maintaining the advantage of fabricating easily a plurality of the probes by easy integration and easy size reduction in the method of the aforementioned Japanese Patent Application Laid-open No. 10-293134, which probe can be fabricated by a batch process with a high productivity and a satisfactory process reproducibility of the optical microaperture, a producing method therefor, a surface observation apparatus, an exposure apparatus and an information processing apparatus.

The above-mentioned object can be attained, according to the present invention.

According to an aspect of the present invention, there is provided a probe for detecting light or irradiating light, comprising:

a cantilever supported at an end thereof by a substrate;

a hollow tip formed at a free end of the cantilever;

a microaperture formed at the end of the tip; and a hollow waveguide formed inside the cantilever.

According to another aspect of the present invention, there is provided a method for producing a probe for light detection or light irradiation, which comprises the steps of working a substrate to form a groove therein, forming a flat plate-shaped cover portion on the groove to form a hollow waveguide having an opening in a part thereof, forming a hollow tip having a microaperture on the opening, and removing a part of the substrate by etching, to form a cantilever.

According to the still another aspect of the present invention, there is provided a surface observation apparatus provided with at least one probe selected from the group consisting of the above probes of the present invention and probes produced by the above method of the present invention.

According to a further aspect of the present invention, there is provided an exposure apparatus provided with at least one probe selected from the group consisting of the probes of the present invention and probes produced by the above method of the present invention.

According to a further aspect of the present invention, there is provided an information processing apparatus provided with at least one probe selected from the group consisting of the above probes of the present invention and probes produced by the above method of the present invention.

BRIEF DESCRIPTION OF THE DRAWINGS

FIG. 11 is a view showing the configuration of an AFM/SNOM composite apparatus of embodiment 4.

DETAILED DESCRIPTION OF THE PREFERRED EMBODIMENTS

Figure 1A:
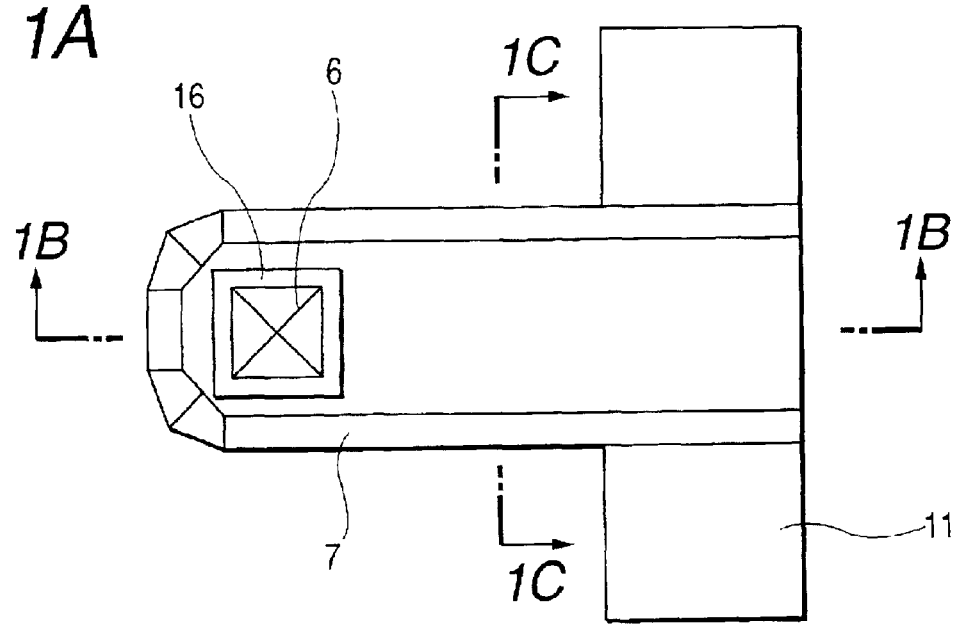
FIGS. 1A, 1B, 1C and 1D are views showing a probe in embodiment 1.
Figure 1B:
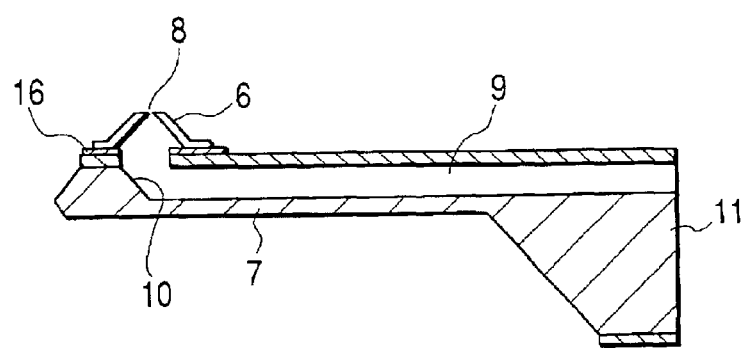
Figure 1C:
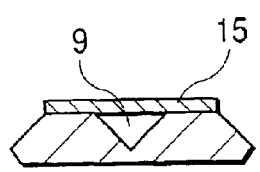

In the following there will be explained, with reference to FIGS. 1A to 1D, a light emitting or light receiving probe utilizing near field light as embodiment of the present invention, wherein FIG. 1A is a plan view thereof, FIG. 1B is a cross-sectional view along line 1B—1B in FIG. 1A, and FIG. 1C is a cross-sectional view along line 1C—1C in FIG. 1A.

Referring to FIGS. 1A to 1D, the probe of the present embodiment is provided with a hollowing tip 6 having a microaperture 8 at a free end portion of a cantilever 7 supported by a probe substrate 11. Inside the cantilever 7, there are provided a hollow waveguide 9 having a space continuous to the tip 6, and a mirror 10 for connecting the light in the waveguide 9 to the tip 6. There are also shown a cover portion 15 and a junction layer 16.

In case of using the probe of the present embodiment for light emission, a light emitting element is connected to an end of an optical fiber opposite to the probe. The light generated in the light emitting element propagates in the optical fiber and enters the waveguide of the probe. The light is then reflected by the mirror to reach the microaperture of the tip.

Thus near field light is locally generated in the vicinity of the microaperture to induce an interaction with the exterior (specimen). Instead of utilizing the optical fiber, the light emitting element may be directly connected.

Also in case using the probe of the present embodiment for light reception, a light receiving element is connected to an end of an optical fiber opposite to the probe. The propagating light entering the microaperture by the interaction with the exterior is reflected by the mirror, thereby entering the waveguide of the probe. Then the light propagates in the optical fiber and reaches the light receiving element. Instead of utilizing the optical fiber, the light receiving element may be directly connected.

The optical probe of the present embodiment shows advantages of easy optical connection between the waveguide and the microaperture and a low transmission loss. This is because the light in the waveguide is guided to the microaperture by reflection with the mirror.

The optical probe of the present embodiment, having a hollow waveguide, also shows an advantage of a low light transmission loss because of the absence of optical absorption by the material constituting the waveguide.

The optical probe of the present embodiment, being capable of efficiently transmitting the near ultraviolet light which tends to be absorbed in the optical fiber or the like, shows an advantage of low wavelength dependence.

Also in the optical probe of the present embodiment, since the end direction of the tip is substantially perpendicular to the longitudinal direction of the cantilever, it can be used as the probe of an atomic force microscope (AFM) by detecting the bending of the cantilever. For detecting such bending, there is generally adopted a method of irradiating a surface of the cantilever with a laser light and sensing the direction of the reflected light.

Also the optical probe of the present embodiment may be provided, in the probe itself, with detection means for detecting the bending of the cantilever. The bending of the cantilever can be detected for example by forming a piezo resistance member in the cantilever.

In the following there will be explained a method for producing the probe of cantilever type as an example of embodiment of the present invention.

At first a substrate is so worked as to form a groove thereon, and a cover portion is formed on the groove to form a hollow waveguide. The groove can be formed, for example, by a method of etching the substrate utilizing a mask pattern, a method utilizing anodic oxidation or electrolytic etching, a method of forming a groove by dicing, or a method of forming a groove by laser working. As such an etching method, anisotropic etching of a silicon substrate is advantageous in controlling the profile, but ordinary isotropic etchings may also be employed. Also as the substrate, there may be employed various metal substrates or ceramic substrate in addition to the silicon substrate.

After the groove formation, a surface treatment may be executed for forming the worked surface into a mirror flat state. Such surface treatment can be achieved, for example, by a mechanical or chemical polishing method or a method of oxidizing the surface followed by etching. Also a mirror surface may be obtained by forming a metal film such as of aluminum, platinum or silver by vacuum evaporation or sputtering.

Further, the groove is preferably provided, at the tip side thereof, with a mirror structure for reflecting the light toward the tip. For example it is easily possible to form a slanted face constituting a mirror at an end of the groove at the tip side, by employing a silicon substrate of an index of a plane (100) and forming the groove by anisotropic etching. The mirror may also be formed after the formation of the groove. The mirror may also be formed as a concave mirror for condensing the light to the microaperture at the end of the tip.

Then a cantilever cover portion is formed on the groove. The cover is formed into the shape of a cantilever, and an opening is formed in a portion for adjoining the tip. The formation of the cantilever cover portion on the groove can be achieved, for example, by adjoining a substrate on the groove and thinning the substrate. For example, there can be employed a method of adjoining an SOI layer of an SOI substrate and removing the handle wafer and the oxide film by polishing or etching, or a method of adjoining a substrate having an ion-injected layer or a pn junction and thinning the substrate utilizing the etching stop method. In such a case it is also possible to execute the adjoining after the structure is patterned in the cover portion. There can also be conceived a method of adjoining a sheet-shaped structured member and patterning such member, and a method of filling the groove with a resinous material or the like and forming a film thereon constituting the cover portion. The adjoining of the substrate can be achieved, for example, by a method utilizing an adhesive material, an adjoining method by chemical surface erosion, an adjoining method by thermal diffusion, an adjoining method by surface activation or an adjoining method by pressing.

Then there is prepared a tip having a microaperture. For this purpose there can be employed a method of forming a film of the material of the tip in a recess formed on a substrate and transferring such tip onto the opening formed in the cover portion. For example there can be employed, in forming the tip layer in the recess of the substrate, a method in which the film thickness becomes smaller in a portion to constitute the front end portion of the projection or the film formation is not executed in such front end portion (Japanese Patent Application Laid-open No. 11-066650). It is also possible to selectively remove the tip layer at the front end portion of the projection, after the structured member of the probe is transferred to the 2nd substrate. For example, the optical microaperture can be formed by forming a film thickness regulating layer on the surface of the tip layer in such a manner that the front end portion of the projection becomes particularly thin, and then etching the film thickness regulating layer and the tip layer in succession (Japanese Patent Application Laid-open No. 11-064350). Also the above-mentioned two methods may be used in combination to more easily form the optical microaperture of satisfactory shape reproducibility.

Finally, a part of the substrate subjected to the foregoing steps is removed to obtain a probe of cantilever type having a projection at the free end portion. More specifically, it is desirable to employ a monocrystalline silicon substrate of an orientation (100) as the 2nd substrate and to employ crystal axis anisotropic etching for etching such substrate. The dry etching utilizing high density plasma is also effective.

An end portion of the hollow waveguide at the side of the supporting substrate is so worked as to facilitate optical connection with a light emitting or receiving element or an optical fiber. In a simplest method, the substrate is worked with an ion beam, a laser light or a dicing saw to expose the end portion of the waveguide. The optical fiber or the light emitting or receiving element may be directly connected to such end portion or optically connected for example through a lens or the like. Also an opening may be formed by removing a part of the structured member covering the waveguide layer by etching or the like. The opening may be formed at the opposite side to the substrate of the waveguide layer, or at the side of the substrate. In case of forming the opening at the side of the substrate, a penetrating hole is formed in order to introduce light into the substrate. The introduction of light into the opening may be facilitated by forming an optical coupling device such as a prism or a mirror.

The producing method for the optical probe of the present embodiment, being executable in a batch process, has the advantages of high productivity and high process reproducibility of the optical microaperture. This method, being easily capable of integration and size reduction, can easily produce plural probes thereby improving the productivity. The method can also produce a multi-probe chip having plural probes.

The present invention also includes a surface observation apparatus, an exposure apparatus and an information processing apparatus employing at least an above-mentioned probe. The surface state of a specimen can be observed by maintaining the probe of the configuration of the present invention close to the specimen, two-dimensionally scanning the surface of the specimen by an x-y actuator and detecting the evanescent light emerging from the surface of the specimen.

It is also possible to prepare an exposure apparatus capable of forming a pattern finer than the wavelength of the light, by exposing photoresist with a probe employing the configuration of the present invention.

There can also be formed a recording-reproducing apparatus by employing the aforementioned probe for varying the surface state in a microarea of a recording medium and observing such variation in the surface state. In such operations, the SNOM signal itself can be used for the distance control or contact force control with the specimen or the recording medium. Also there may be employed an STM method or a shearing force method, and the present invention is not limited by such methods.

It is also possible to provide a surface observation apparatus, an exposure apparatus or a recording-reproducing apparatus of a high transfer rate by parallel processing of information utilizing a multi-probe utilizing the configuration of the present invention. The recording medium in such application can be, as an example of the recording medium showing a change in the optical characteristics by a voltage application, a diacetylene derivative polymer such as 10, 12-pentacosadiinic acid which causes a change in the structure by Joule's heat resulting from a local current generated by a voltage application thereby showing a shift in the peak wavelength of the light absorption band, as described in the Japanese Patent Application Laid-open No. 4-90152. Also as an example of the recording medium showing a change in the optical characteristics by a voltage application under light irradiation, there can be mentioned an azo compound having a quinone radical and a hydroquinone radical showing a cis-trans photomesomeric reaction only under light irradiation to form a redox pair and showing a proton migration in such redox pair under the application of an electric field, as disclosed in the Japanese Patent Application Laid-open No. 2-98849.

In the following there will be explained embodiments of the present invention.

[Embodiment 1]

FIGS. 1A to 1D show the configuration of a probe in embodiment 1 of the present invention, wherein FIG. 1A is a plan view, FIG. 1B is a cross-sectional view along line 1B—1B in FIG. 1A, and FIG. 1C is a cross-sectional view along line 1C—1C in FIG. 1A. As shown in FIGS. 1A to 1D, the probe of the present embodiment is provided with a hollow tip 6 having a microaperture 8, at a free end portion of a cantilever 7 supported by a probe substrate 11. Inside the cantilever 7, there are provided a hollow waveguide 9 having a space continuous with the tip 6, and a mirror 10 for guiding the light of the waveguide 9 to the tip 6.

In the following there will be explained a method for producing the probe of the present embodiment, with reference to FIGS. 2A to 2E, 3A to 3G, 4A to 4C and 5A to 5D. At first there was prepared a monocrystalline silicon wafer of an index of a plane (100) as a tip substrate 1, and a silicon thermal oxide film was formed with a thickness of 200 nm as a mask layer 2.

Figure 2A:
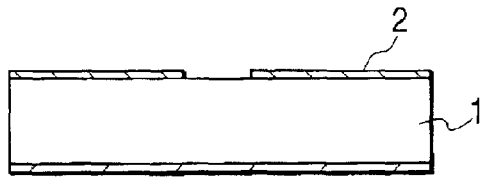
FIGS. 2A, 2B, 2C, 2D and 2E are views showing steps for producing the probe of embodiment 1.

Then a desired portion of the surfacial mask layer 2 was patterned by a photolithographic process and etching with aqueous solution of hydrogen fluoride and ammonium fluoride to expose a part of silicon (cf. FIG. 2A).

Then the silicon in the patterned portion was etched by crystal axis anisotropic etching with 30% aqueous solution of potassium hydroxide of 90° C. This process formed a recess of an inverted pyramidal shape of a depth of about 7 μm, surrounded by four faces equivalent to the index of a plane (111) (cf. FIG. 2B).

Figure 2B:
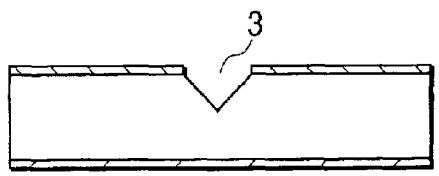
Figure 2C:
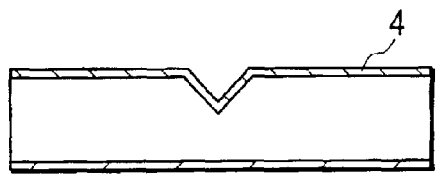

Then, after the mask layer 2 was removed with aqueous solution of hydrogen fluoride and ammonium fluoride, a silicon thermal oxide film was formed with a thickness of 400 nm as a peeling layer 4 (cf. FIG. 2C).

Figure 2D:
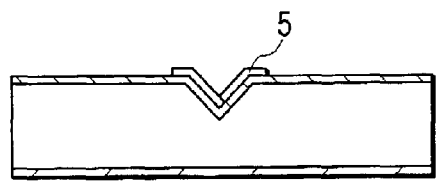
Figure 2E:
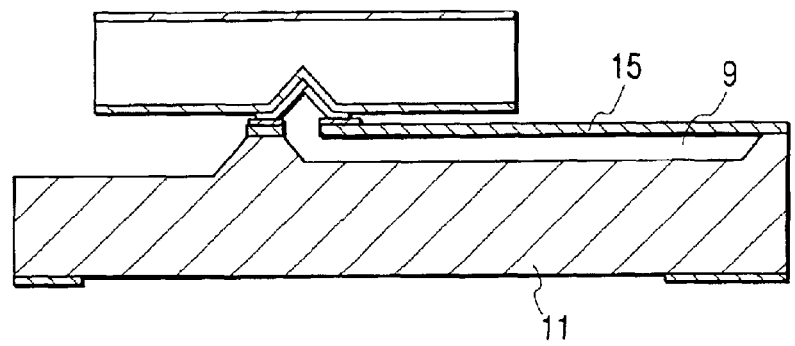

Then a platinum layer and a gold layer were formed by sputtering with respective thicknesses of 200 nm and 300 nm as a tip layer 5, and were patterned by photolithography and dry etching (cf. FIG. 2D). In these film formations, the incident angle of the sputtered particles to the substrate was so adjusted that the tip layer 5 becomes thinner at the most pointed portion of the recess 3.

Figure 3A:
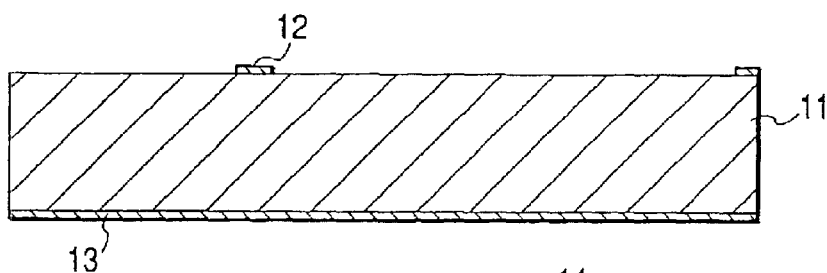
FIGS. 3A, 3B, 3C, 3D, 3E, 3F and 3G are views showing steps for producing the probe of embodiment 1.

Then a monocrystalline silicon wafer of an index of a plane (100) was prepared as a probe substrate 11, then mask layers 12, 13 of silicon nitride were formed with a thickness of 200 nm on both surfaces of the substrate by low-pressure chemical vapor deposition method, and were patterned by photolithography and reactive ion etching with $CF_4$ gas (cf. FIG. 3A).

Then the probe substrate 11 was anisotropically etched with aqueous solution of potassium hydroxide heated to 90° C. to form portions for constituting a groove 14 of V-shaped section for forming the waveguide, a mirror 10 and a cantilever 7 (cf. FIG. 2B).

Figure 3B:
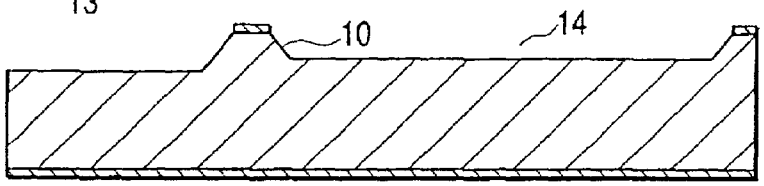
Figure 4A:
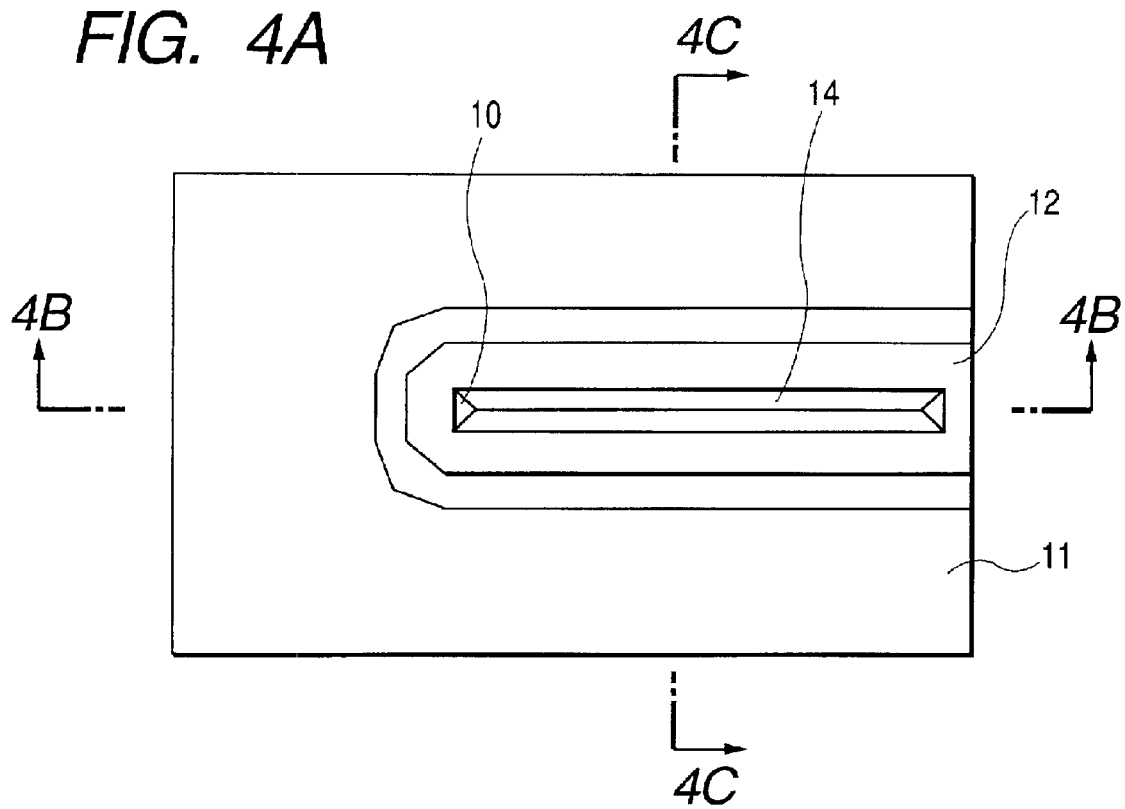
FIGS. 4A, 4B and 4C are views showing steps for producing the probe of embodiment 1.
Figure 4B:
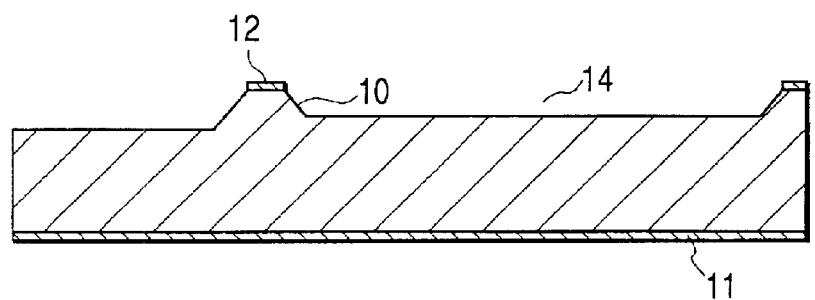
Figure 4C:
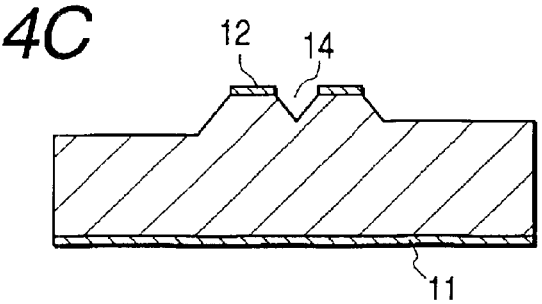

FIGS. 4A to 4C show the steps in FIG. 3B, wherein FIG. 4A is a plan view, FIG. 4B is a cross-sectional view along line 4B—4B in FIG. 4A, and FIG. 4C is a cross-sectional view along line 4C—4C in FIG. 4A. The groove 14 is formed inside a portion for constituting the cantilever 7. Owing to the characteristics of anisotropic etching, the etching almost stops when it proceeds to the deepest portion of the groove 14. In the present embodiment, the portion around the cantilever 7 was etched deeper than the deepest portion of the groove 14.

Then the details of the step shown in FIG. 3C for adjoining the cover portion 15 will be explained with reference to FIGS. 5A to 5D.

At first there was prepared an SOI (silicon on insulator) substrate 21 (cf. FIG. 5A), with an SOI layer 22 of 1 μm thick and a silicon oxide layer 23 of 1 μm thick.

Figure 5A:
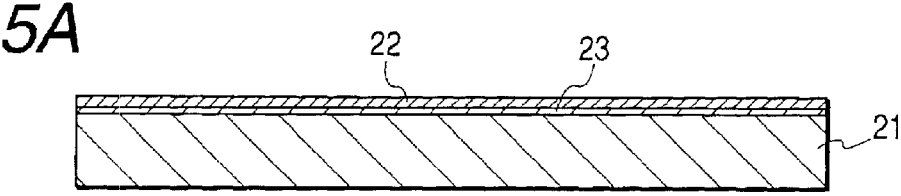
FIGS. 5A, 5B, 5C and 5D are views showing steps for producing the probe of embodiment 1.
Figure 5B:
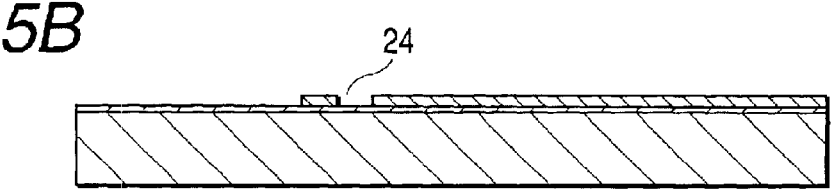
Figure 5C:
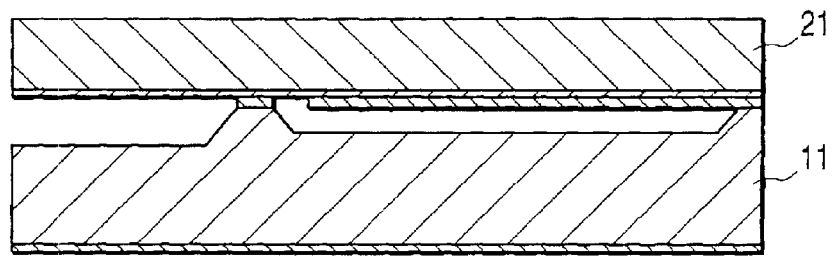

Then the SOI layer 22 was patterned by photolithography and reactive ion etching with $SF_6$ to form an opening 24 (cf. FIG. 5B). Then the SOI layer 22 of the SOI substrate 21 and the probe substrate 11 shown in FIG. 3F were mutually opposed and so aligned that the opening 24 on the SOI substrate 21 is positioned on the mirror 10 of the probe substrate 11, and were contacted under a load and heat treated at 800° C. to adjoin the SOI layer 22 and the probe substrate 11 (cf. FIG. 5C).

Figure 3C:
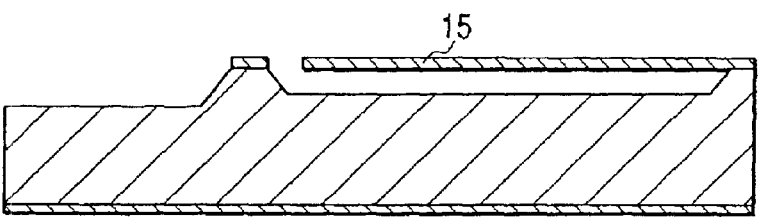
Figure 5D:
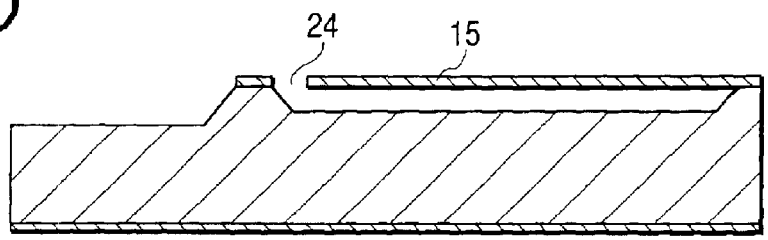

Then silicon of the handle wafer of the SOI substrate 21 was removed by polishing followed by wet etching with aqueous solution of potassium hydroxide, and the silicon oxide layer 23 was removed by wet etching with mixed aqueous solution of fluoric acid and ammonium fluoride, thereby forming a cover portion 15 (cf. FIGS. 5D and 3C). In this manner there was formed a hollow waveguide of a triangular section having an opening 24.

Then a chromium film and a gold film were formed by vacuum evaporation with respective thicknesses of 5 nm and 100 nm, and were patterned by photolithography and wet etching to form an adjoining layer 16. Then the tip substrate 1 shown in FIG. 2D and the probe substrate 11 were aligned and pressed under a load whereby the tip layer 5 was adjoined on the adjoining layer 16 (cf. FIG. 2E).

Figure 3D:
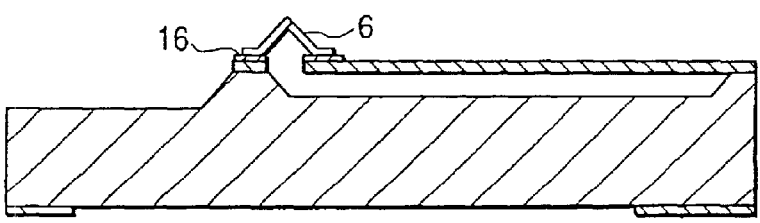

Then the tip substrate 1 and the probe substrate 11 were mutually separated whereby the cleaving took place at the interface between the tip layer 5 and the peeling layer 4 and the tip layer 5 was transferred onto the adjoining layer 16 to form the tip 6 (cf. FIG. 3D).

Figure 3E:
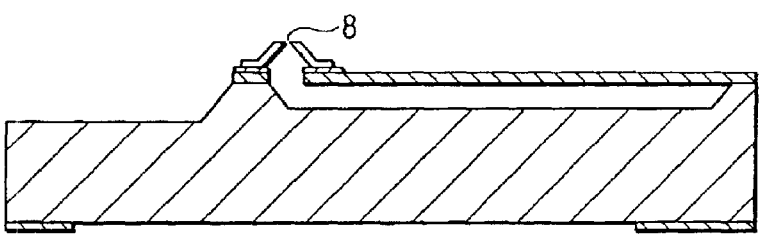

Then a PSG (phosphor silicate glass) film was formed by chemical vapor deposition with a thickness of 100 nm on the surface of the tip 6, and a part of PSG and tip was dry etched with argon gas to form a microaperture 8 (cf. FIG. 3E). Such microaperture formation utilizing PSG is disclosed in Japanese Patent Application Laid-open No. 11-064350. In the present embodiment, the formation of the microaperture was further facilitated by forming the tip layer 5 thinner at the most pointed portion of the recess 3, as disclosed in Japanese Patent Application Laid-open No. 11-066650.

Figure 3F:
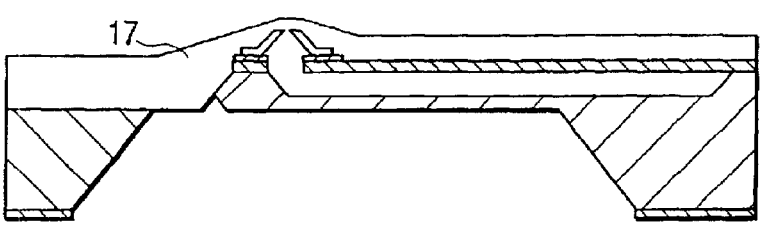
Figure 3G:
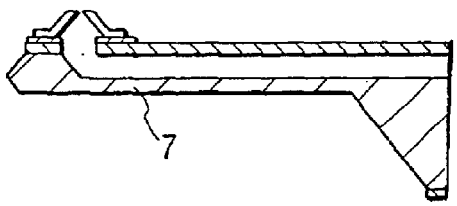

Then the surface of the probe substrate 11 was protected with polyimide 17, and silicon of the probe substrate 11 was partially etched off by utilizing a jig which immerses only the rear surface of the substrate 11 and employing aqueous solution of tetramethylammonium hydroxide heated at 90° C., utilizing the mask layer on the rear surface of the probe substrate 11 as an etching mask (cf. FIG. 3F).

Then the substrate was cut with a dicing saw to form an opening of the waveguide 9 on the substrate supporting portion. Finally polyimide 17 was removed by ashing to form the cantilever 7 (cf. FIG. 3G). The cantilever 7 had a length of 5 mm and a spring constant of 0.1 N/m.

Figure 1D:
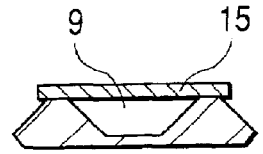

In the present embodiment, there has been explained the process of forming a probe, but it is also possible to simultaneously form plural probes on a same substrate, thereby allowing to improve the productivity. It is also possible to form a multi-probe chip having plural probes. It is furthermore possible, by modifying the forming process for the groove 14, to form a waveguide 9 having a trapezoidal cross section as shown in FIG. 1D.

Figure 6A:
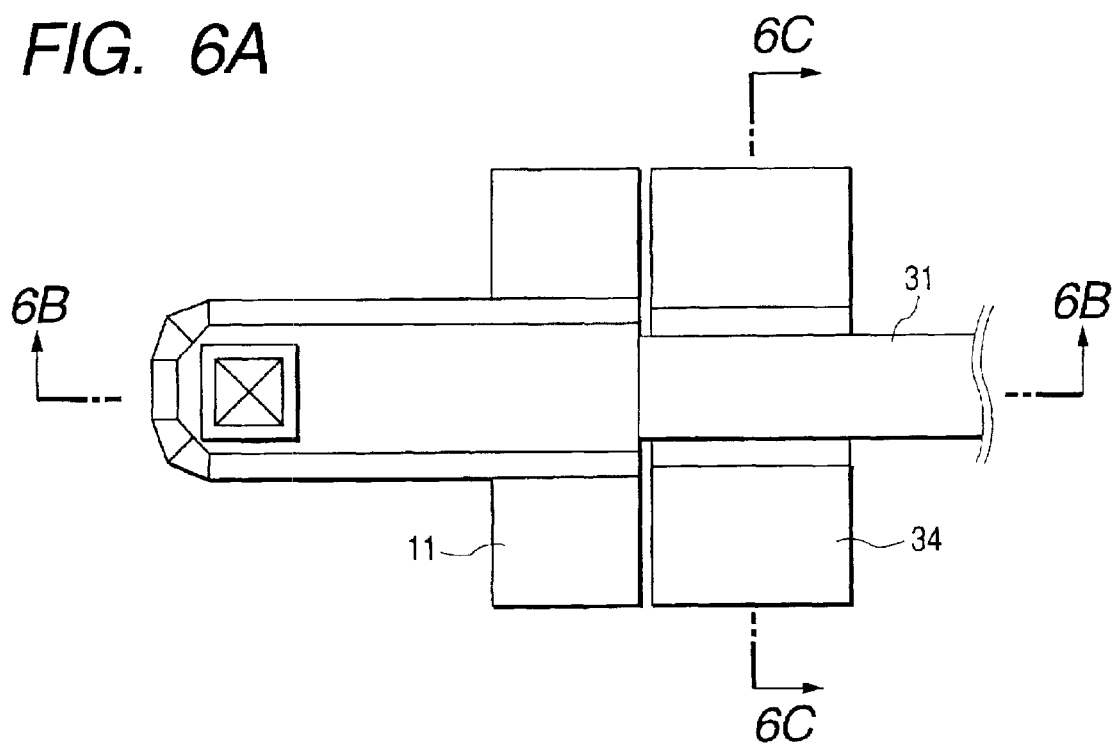
FIGS. 6A, 6B and 6C are views showing a method of using the probe of embodiment 1.
Figure 6B:
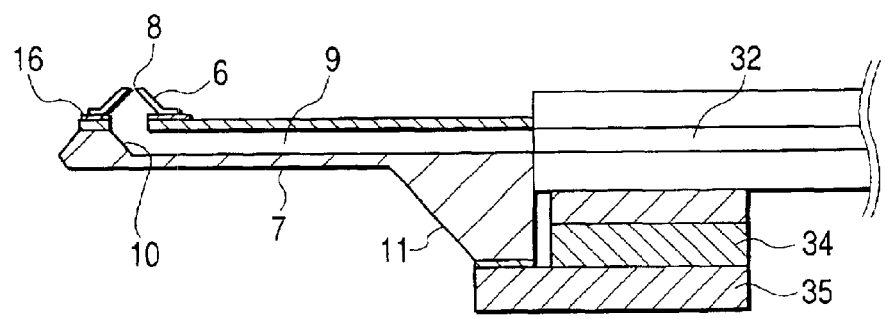
Figure 6C:
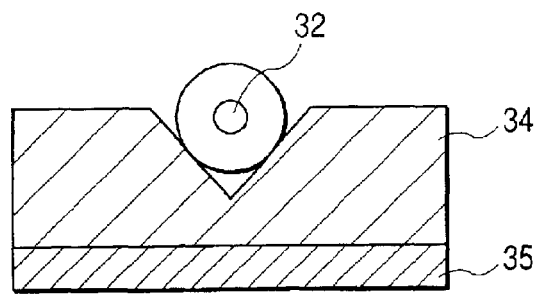

Now there will be explained, with reference to FIGS. 6A to 6C, an example of method of use of the probe of the present embodiment, wherein FIG. 6A is a plan view, FIG. 6B is a cross-sectional view along line 6B—6B in FIG. 6A, and FIG. 6C is a cross-sectional view along line 6C—6C in FIG. 6A.

An end of the waveguide of the probe of the present embodiment is adjoined to an end of a core 32 of the optical fiber 31, and the probe substrate 11 and the optical fiber 31 are connected by means of a connecting substrate 35 and a fiber supporting substrate 34.

In case the probe of the present embodiment is used for light emission, a light emitting element is connected to a side of the optical fiber 31 opposite to the probe. The light emitted by the light emitting element propagates in the optical fiber 31 to enter the waveguide 9 of the probe, then reflected by the mirror 10 and reaches the microaperture of the tip 6. Thus near field light is locally present in the vicinity of the microaperture, thereby generating an interaction with the exterior (specimen).

Also in case the probe of the present embodiment is used for light receiving, a light receiving element is connected to a side of the optical fiber 31 opposite to the probe. Propagating light entering the microaperture by an interaction with the exterior is reflected by the mirror 10 to enter the waveguide 9, then propagates to the optical fiber 31 and reaches the light receiving element. The probe can also be used as the probe of an atomic force microscope by detecting the bending of the cantilever resulting from the interaction between the specimen and the tip.

The present embodiment thus provides a method for producing an optical probe, capable of being executable in a batch process thereby realizing a high productivity, also providing satisfactory process reproducibility of the optical microaperture, and easily attaining integration and size reduction thereby enabling manufacture of plural probes easily. Also there can be provided an optical probe showing a low light transmission loss between the waveguide and the microaperture and a low transmission loss at the short wavelength in the waveguide.

[Embodiment 2]

Figure 7A:
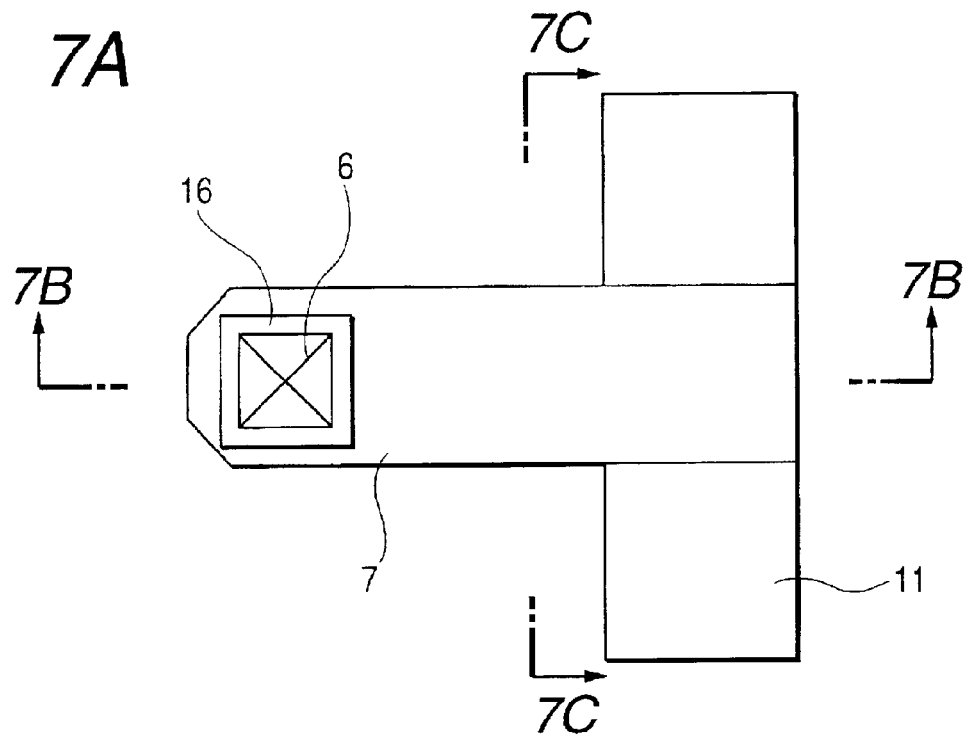
FIGS. 7A, 7B and 7C are views showing a probe of embodiment 2.
Figure 7B:
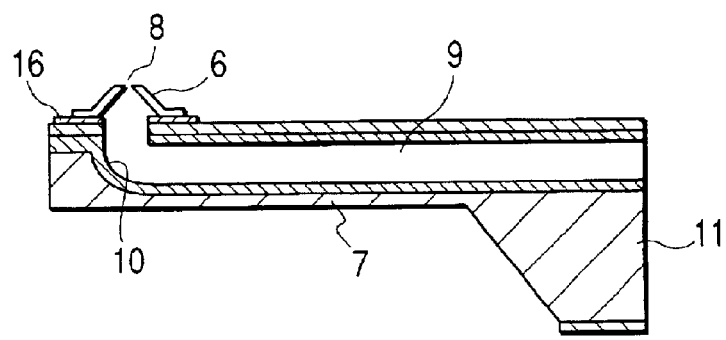
Figure 7C:
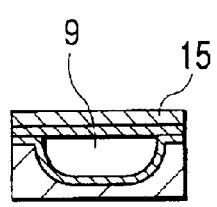

FIGS. 7A to 7C show the configuration of a probe in embodiment 2 of the present invention, wherein FIG. 7A is a plan view, FIG. 7B is a cross-sectional view along line 7B—7B in FIG. 7A and FIG. 7C is a cross-sectional view along line 7C—7C in FIG. 7A. Referring to FIGS. 7A to 7C, the probe of the present embodiment is provided at a free end portion of a cantilever 7 supported by a probe substrate 11, with a hollow tip 6 having a microaperture 8. Inside the cantilever 7, there are provided a waveguide 9 having a space continuous with the tip 6, and a mirror 10 for guiding the light in the waveguide 9 to the tip 6. There is also shown a cover portion 15.

In the following there will be explained the method for producing the probe of the present embodiment, with reference to FIGS. 2A to 2E, 8A to 8G and 9A to 9E.

At first, a tip layer 5 was formed on a tip substrate 1 by a process similar to that in embodiment 1 (cf. FIGS. 2A to 2E).

Then a monocrystalline silicon wafer was prepared as the probe substrate 11, and mask layers 12, 13 of silicon nitride were formed with a thickness of 200 nm on both surfaces of the substrate by low-pressure chemical vapor deposition and were patterned by photolithography and reactive ion etching utilizing $CF_4$ gas.

Figure 8A:
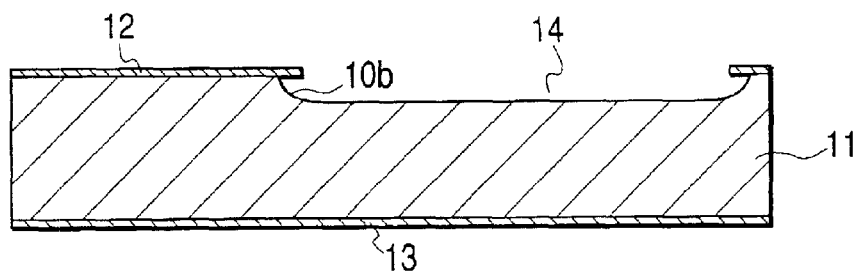
FIGS. 8A, 8B, 8C, 8D, 8E, 8F and 8G are views showing steps for producing the probe of embodiment 2.

Then the probe substrate 11 was etched with mixed aqueous solution of fluoric acid, nitric acid and acetic acid to form a groove 14 of a U-shaped section for constituting the waveguide 9 and a concave mirror 10b (FIG. 8A).

Then the surfacial mask layer 12 was removed by reactive ion etching again with $CF_4$ gas.

Figure 8B:
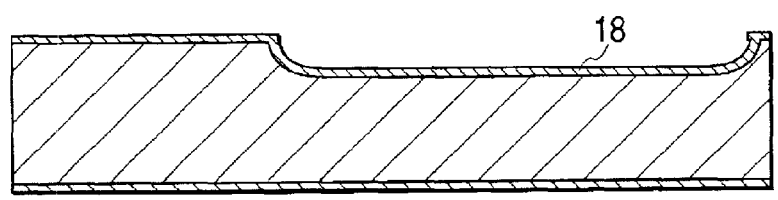

Then an aluminum layer 18 was formed with a thickness of 100 nm by sputtering on the probe substrate 11 (cf. FIG. 8B). This process forms the mirror portion into a mirror surface state.

In the following there will be explained the adjoining of the cover portion 15 with reference to FIGS. 9A to 9E.

At first there was prepared an SOI substrate 21 (cf. FIG. 9A) with an SOI layer 22 of 1 µm in thickness and a silicon oxide layer 23 of 1 µm in thickness.

Figure 9A:
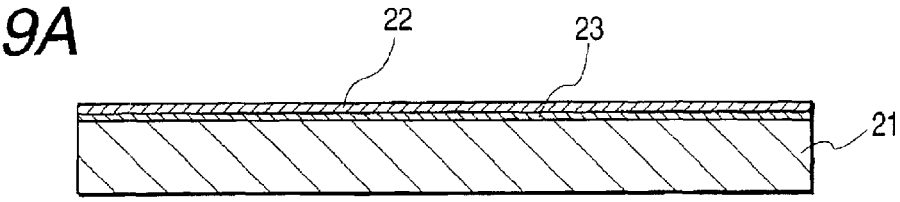
FIGS. 9A, 9B, 9C, 9D and 9E are views showing steps for producing the probe of embodiment 2.
Figure 9B:
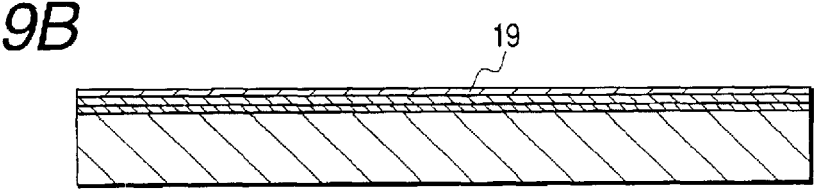

Then an aluminum 19 was formed with a thickness of 100 nm by sputtering on the SOI substrate 21 (cf. FIG. 9B).

Figure 9C:
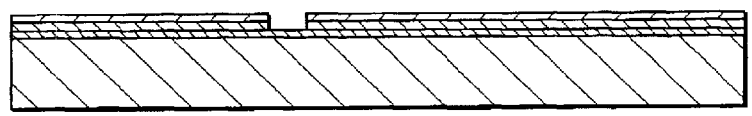

Then the aluminum layer was patterned by photolithography and etching with mixed aqueous solution of phosphoric acid, nitric acid and acetic acid, and the SOI layer 22 was patterned by reactive ion etching of silicon utilizing $SF_6$ to form an opening (cf. FIG. 9C).

Figure 9D:
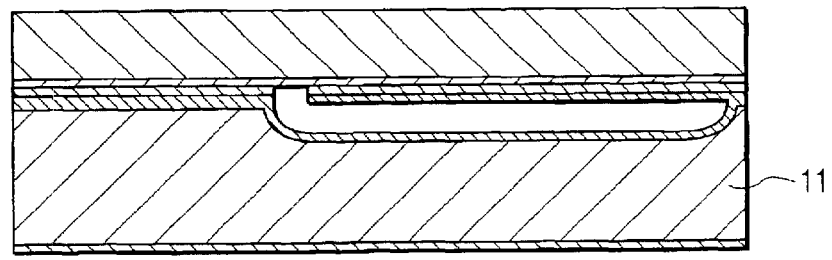

Then the surfaces of the aluminum layers 18, 19 of the SOI substrate 21 and the probe substrate 11 were treated with plasma in vacuum, then were mutually opposed and so aligned that the opening of the SOI substrate 21 was positioned above the concave mirror 10b of the probe substrate 11, and were contacted under a load to adjoin the SOI layer 22 and the probe substrate 11 (cf. FIG. 9D). In this manner there was prepared a hollow waveguide 9 having a U-shaped cross section.

Figure 8C:
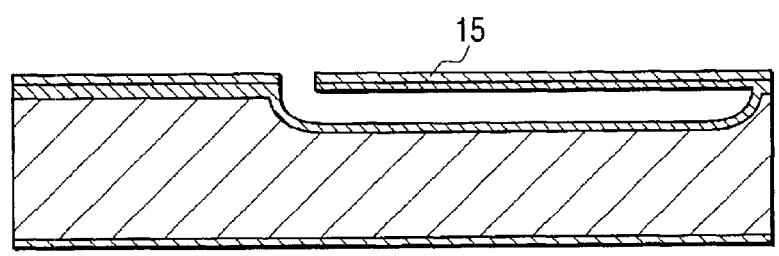
Figure 9E:
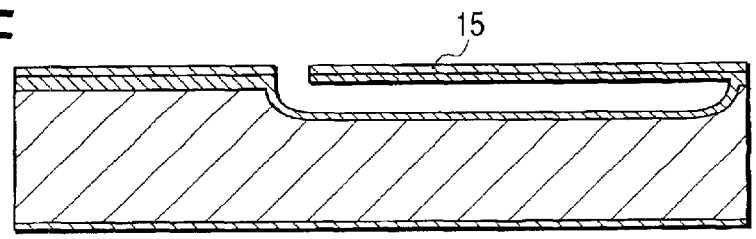

Then silicon of the handle wafer of the SOI substrate 21 was removed by polishing followed by wet etching with aqueous solution of potassium hydroxide, and the silicon oxide layer 23 was removed by wet etching with mixed aqueous solution of fluoric acid and ammonium fluoride, thereby forming a cover portion 15 (cf. FIGS. 9E and 8C).

Then a chromium film and a gold film were formed by vacuum evaporation with respective thicknesses of 5 nm and 100 nm, and were patterned by photolithography and wet etching to form an adjoining layer 16. Then the tip substrate 1 shown in FIG. 2D and the probe substrate 11 were aligned and pressed under a load whereby the tip layer 5 was adjoined on the adjoining layer 16.

Figure 8D:
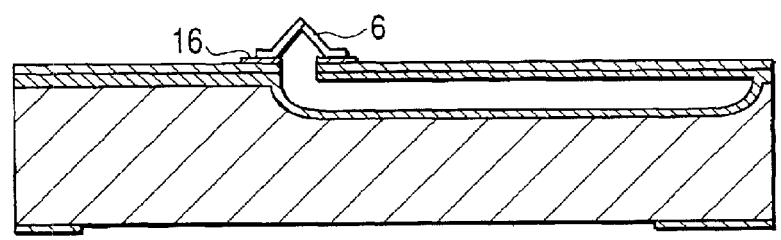

Then the tip substrate 1 and the probe substrate 11 were mutually separated whereby the cleaving took place at the interface between the tip layer 5 and the peeling layer 4 and the tip layer 5 was transferred onto the adjoining layer 16 to form the tip 6 (cf. FIG. 8D).

Then the surface of the probe substrate 11 was protected with polyimide 17, and silicon of the probe substrate 11 was partially etched off by utilizing a jig which immerses only the rear surface of the substrate 11 and employing aqueous solution of tetramethylammonium hydroxide heated at 90° C., utilizing the mask layer 13 on the rear surface of the probe substrate 11 as an etching mask (cf. FIG. 3F). Then the polyimide was removed by ashing.

Figure 8E:
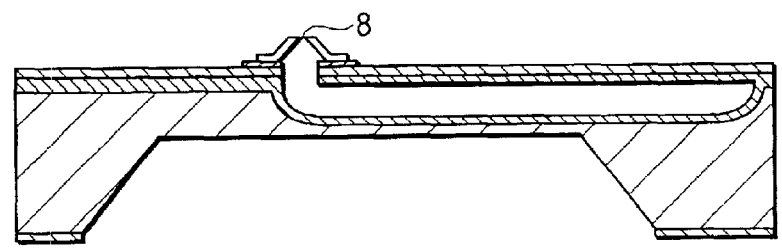
Figure 8F:
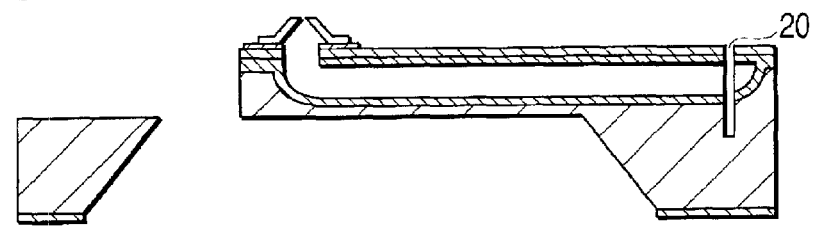
Figure 8G:
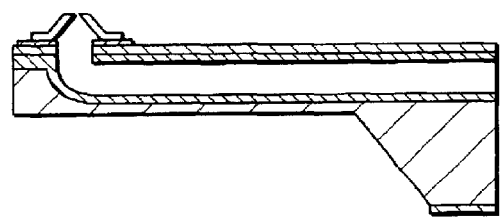

Then PSG (phosphor silicate glass) was formed with a thickness of 100 nm on the surface of the tip 6 by chemical vapor deposition, and a part of PSG and the tip 6 was removed by dry etching utilizing argon gas to form a microaperture 8 (cf. FIG. 8E).

Then a scribe groove 20 was formed on the probe substrate 11 by a dicing saw to form an opening of the waveguide 9 on the supporting portion of the substrate 11. Then Si and Al were patterned by reactive ion etching by photolithography and reactive ion etching with $SF_6$ to form a cantilever 7 (cf. FIG. 8F), which had a length of 5 mm and a spring constant of 0.1 N/m. Finally the probe substrate 11 was cleaved along the scribe groove 20 to complete the probe (cf. FIG. 8G).

The present embodiment thus provides a method for producing an optical probe, capable of being executable in a batch process thereby realizing a high productivity, also providing satisfactory process reproducibility of the optical microaperture, and easily attaining integration and size reduction thereby enabling manufacture of plural probes easily.

Also there can be provided an optical probe showing a low light transmission loss between the waveguide and the microaperture and a low transmission loss at the short wavelength in the waveguide.

Also the walls of the waveguide 9 are constituted by aluminum layers 18, 19 to reduce the light absorption by the path walls. Also the preparation of the waveguide by the isotropic etching allows to form the connection portion from the waveguide to the tip as a concave mirror 10b, thereby realizing a light condensing effect onto the microaperture.

[Embodiment 3]

Embodiment 3 of the present invention provides a simplified producing method in comparison with embodiment 2, as will be explained with reference to FIGS. 2A to 2E and 10A to 10G. The configuration of the probe of the present embodiment is similar to that of embodiment 2 and will not, therefore, be explained further.

At first, a tip layer 5 was formed on a tip substrate 1 by a process similar to that in embodiment 1 (cf. FIGS. 2A to 2E).

Then a monocrystalline silicon wafer was prepared as the probe substrate 11, and mask layers 12, 13 of silicon nitride were formed with a thickness of 200 nm on both surfaces of the substrate by low-pressure chemical vapor deposition and were patterned by photolithography and reactive ion etching utilizing $CF_4$ gas.

Figure 10A:
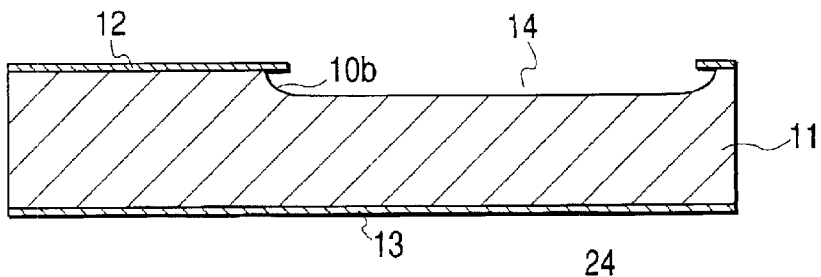
FIGS. 10A, 10B, 10C, 10D, 10E, 10F and 10G are views showing steps for producing the probe of embodiment 3.
Figure 10B:
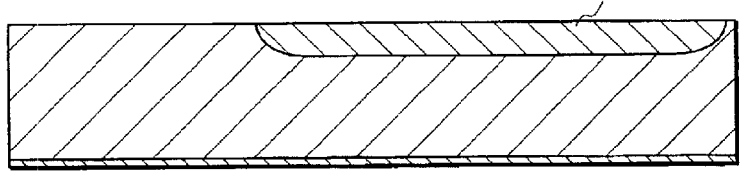

Then the probe substrate 11 was etched with mixed aqueous solution of fluoric acid, nitric acid and acetic acid to form a groove 14 of U-shaped section for constituting the waveguide 9 and a concave mirror 10b (FIG. 10A).

Then the surfacial mask layer 12 was removed by reactive ion etching again with $CF_4$ gas. Then photoresist was dropped, hardened and thinned by polishing to form a resin layer 24 (cf. FIG. 10B).

Figure 10C:
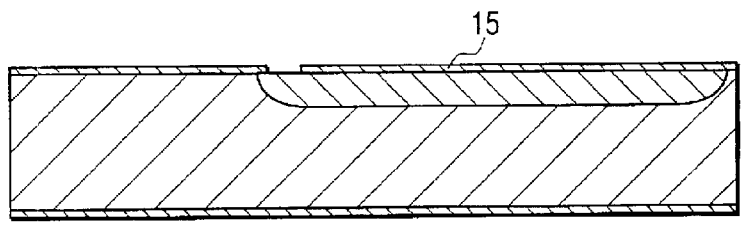

Then an aluminum layer and a gold layer were formed with respective thicknesses of 100 nm and 100 nm by vacuum evaporation, and were patterned by photolithography and wet etching to form a cover portion 15 having an opening on the concave mirror 10b of the probe substrate 11 (cf. FIG. 10C). The cover portion 15 of the present embodiment serves as a light shielding portion of the waveguide and also as the adjoining layer in embodiments 1 and 2.

Then the tip substrate 1 shown in FIG. 2D and the probe substrate 11 were aligned and pressed under a load whereby the tip layer 5 was adjoined on the adjoining layer 16.

Figure 10D:
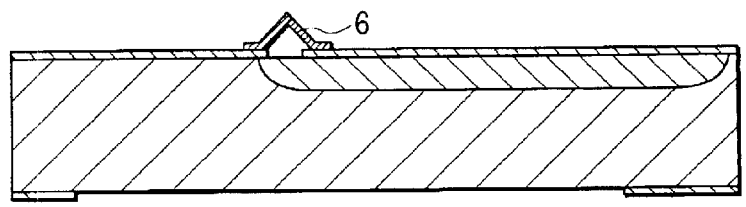

Then the tip substrate 1 and the probe substrate 11 were mutually separated whereby the cleaving took place at the interface between the tip layer 5 and the peeling layer 4 and the tip layer 5 was transferred onto the adjoining layer 16 to form the tip 6 (cf. FIG. 10D).

Then the surface of the probe substrate 11 was protected with polyimide 17, and silicon of the probe substrate 11 was partially etched off by utilizing a jig which immerses only the rear surface of the substrate 11 and employing aqueous solution of tetramethylammonium hydroxide heated at 90° C., utilizing the mask layer 13 on the rear surface of the probe substrate 11 as an etching mask. Then the polyimide 17 was removed by ashing.

Figure 10E:
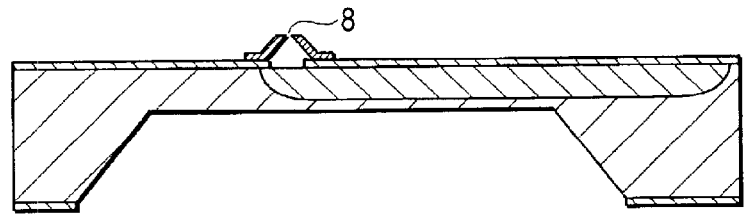
Figure 10F:
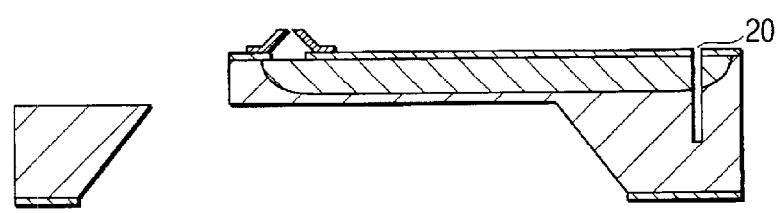

Then PSG (phosphor silicate glass) was formed with a thickness of 100 nm on the surface of the tip 6 by chemical vapor deposition, and a part of PSG and the tip 6 was removed by dry etching utilizing argon gas to form a microaperture 8 (cf. FIG. 10E).

Then a scribe groove 20 was formed on the probe substrate 11 by a dicing saw to form an opening of the waveguide 9 on the supporting portion of the substrate 11. Then Si and Al were patterned by reactive ion etching by photolithography and reactive ion etching with $SF_6$ to form a cantilever 7 (cf. FIG. 10F), which had a length of 5 mm and a spring constant of 0.1 N/m.

Figure 10G:
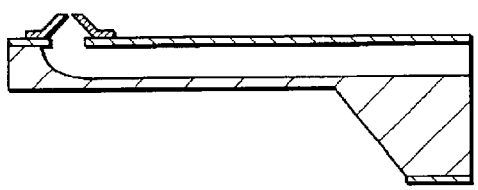

Finally the probe substrate 11 was cleaved along the scribe groove 20 and the resin layer 24 in the waveguide 9 was removed by organic solvent to complete the waveguide 9 with a U-shaped cross section thereby completing the probe (cf. FIG. 10G).

The present embodiment thus provides a method for producing an optical probe, capable of being executable in a batch process thereby realizing a high productivity, also providing satisfactory process reproducibility of the optical microaperture, and easily attaining integration and size reduction thereby enabling manufacture of plural probes easily.

Also there can be provided an optical probe showing a low light transmission loss between the waveguide and the microaperture and a low transmission loss at the short wavelength in the waveguide.

Also in the present embodiment, the filling of the groove 14 with the resin layer 24 allows to simplify the producing process in comparison with embodiment 2.

[Embodiment 4]

Embodiment 4 of the present invention provides an AFM/SNOM composite apparatus as embodiment of the surface observation apparatus, employing the probe of the present invention of the aforementioned configuration as an evanescent light emitting element, and the configuration of such apparatus is shown in FIG. 11.

The present apparatus is composed of a probe 40 having the configuration of the present invention, a laser light source 41 for irradiating the free end of the cantilever of the probe 40 with laser light, a position sensor 43 for detecting the change in the reflection angle of the light resulting from the bending displacement of the cantilever, a displacement detection circuit 46 for detecting the displacement by the signal from the position sensor, an XYZ-axes driven piezo element 45, an XYZ-axes driver 47 for driving the piezo element into the directions of X, Y and Z axes, and a weaklight detector 48 for detecting propagating light generated by scattering of the evanescent light, coming out of the microaperture, by the surface of a specimen 44.

The AFM/SNOM composite apparatus of the present embodiment allows to simultaneously measure the optical information and the shape information of the specimen surface. Also a hard probe, which tends to be easily damaged by contact with the specimen, can be relieved from such damage by mounting on the cantilever. Also there can be provided an SNOM apparatus not requiring feedback control in the Z (height) direction by observing the optical information in the contact state. Also by employing a photosensitive material as the specimen 44, there can be formed a desired exposure pattern on the specimen and there could be confirmed that the aforementioned AFM/SNOM apparatus had the function as an exposure apparatus.

[Embodiment 5]

Figure 12:
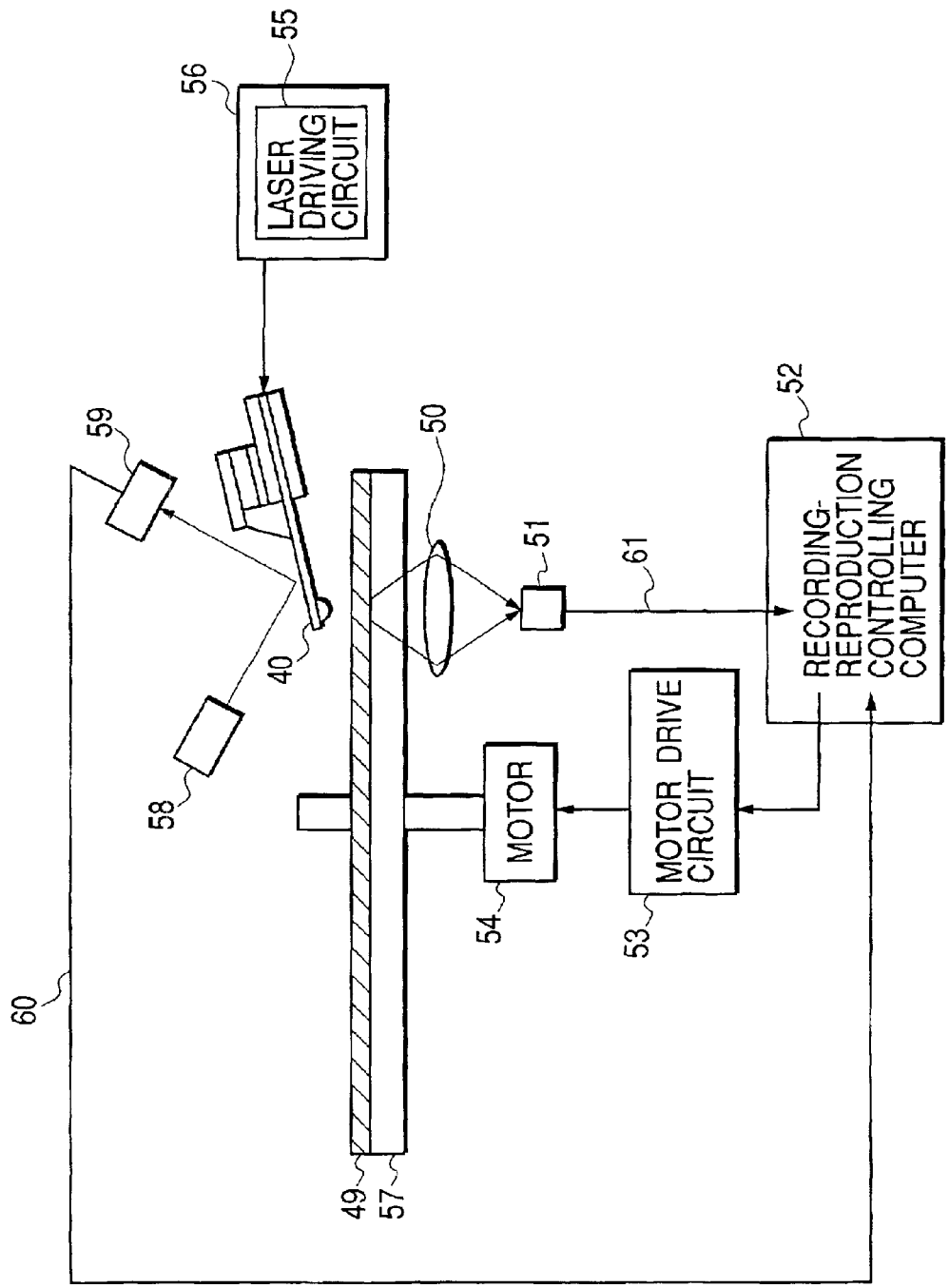
FIG. 12 is a view showing the configuration of an information processing apparatus of embodiment 5.

Embodiment 5 of the present invention constitutes an information processing apparatus employing the probe of the aforementioned configuration of the present invention as an evanescent light emitting element, as illustrated in FIG. 12. As shown in FIG. 12, laser light emitted from a planar light emitting laser 56 driven by a laser driving circuit 55 is transmitted in a transmission path in a probe 40 and is emitted as evanescent light from the microaperture at the end of the probe 40. The evanescent light is brought close, with a short distance not exceeding 100 nm, to the surface of a recording medium 49 on a substrate 57. On the other hand, laser light emitted from an AFM laser 58 irradiates the rear surface of the cantilever portion of the probe, and the change in the angle of the reflected light is detected by a two-sectioned sensor 59 to detect the bending amount of the cantilever thereby obtaining an atomic force microscope (AFM) signal reflecting the surface shape of the specimen, for entry into a recording-reproduction controlling computer 52. The recording and reproduction are executed by irradiating the recording medium 49 on the substrate by the evanescent light generated from the microaperture at the end of the probe 40. The recording is executed with the evanescent light of a high intensity by increasing the intensity of the laser light, while the recording medium 49 is irradiated with the evanescent light of a lower intensity obtained by decreasing the intensity of the laser light, and the transmitted and scattered light is condensed by a condenser lens 50, and is subjected to the detection of intensity by an avalanche photodiode 51 to obtain a reproduction signal 61 which is entered into the recording-reproduction controlling computer 52. The computer 52 drive a motor 54 through a motor drive circuit 53 thereby rotating the recording medium 49 with respect to the probe 40. The obtained AFM signal is entered as an alignment (tracking) control signal to the recording-reproduction controlling computer 52, for positioning the recording medium 49 with respect to the probe 40. A storage apparatus employing the near field light probe of the present invention was capable of stable recording and reproduction, without destruction of the surface of the recording medium, even in case of scanning operation by the prove in a contact state of the end thereof with a soft recording medium composed for example of an organic material.

What is claimed is:

1. A probe for detecting near-field light or irradiating near-field light, comprising:
   a cantilever having first and second ends, and being supported at the first end by a substrate and having the second end free;
   a hollow tip made of different material from that of the cantilever, formed at the free end of said cantilever, said tip having an end;
   a microaperture for utilizing near field light formed at the end of said tip; and
   a groove formed inside said cantilever, said groove comprising a hollow waveguide, providing a space continuous with said tip, and a mirror disposed in said space,
   wherein the mirror reflects the light entering from the microaperture toward the hollow waveguide or reflects the light transmitted in the hollow waveguide toward said microaperture.

2. The probe according to claim 1, wherein the waveguide has a V-shaped transversal cross section.

3. The probe according to claim 1, wherein the waveguide has a trapezoidal transversal cross section.

4. The probe according to claim 1, wherein the waveguide has a U-shaped transversal cross section.

5. The probe according to claim 1, wherein said tip is shaped as a square cone.

6. The probe according to claim 1, wherein said cantilever is principally composed of silicon.

7. The probe according to claim 1, wherein the mirror is a concave mirror.

8. A surface observation apparatus utilizing near field light provided with at least one probe selected from the group consisting of probes according to any one of claims 1 to 5.

9. An exposure apparatus utilizing near field light provided with at least one probe selected from the group consisting of probes according to any one of claims 1 to 5.

10. An information processing apparatus utilizing near field light provided with at least one probe selected from the group consisting of probes according to any one of claims 1 to 5.

11. A probe according to claim 1, wherein the mirror has a slanted face.

12. The probe according to claim 1, wherein a light toward the microaperture reflected by the mirror generates near field light in the vicinity of the microaperture.

13. The probe according to claim 1, wherein a light toward the hollow waveguide reflected by the mirror is a propagating light passing through the microaperture.

* * * * *

UNITED STATES PATENT AND TRADEMARK OFFICE
CERTIFICATE OF CORRECTION

PATENT NO. : 6,891,151 B2
DATED : May 10, 2005
INVENTOR(S) : Yasuhiro Shimada et al.

It is certified that error appears in the above-identified patent and that said Letters Patent is hereby corrected as shown below:

Column 1,
Line 63, "have" should read -- has --.

Column 2,
Line 60, "the" (first occurrence) should be deleted.

Column 4,
Line 1, "using" should read -- of using --.

Column 9,
Line 61, "aluminum" should read -- aluminum layer --.

Column 13,
Line 10, "drive" should read -- drives --; and
Line 20, "prove" should read -- probe --.

Signed and Sealed this

Twenty-seventh Day of September, 2005

JON W. DUDAS
*Director of the United States Patent and Trademark Office*